United States Patent
Stuurman et al.

(10) Patent No.: US 12,482,114 B2
(45) Date of Patent: Nov. 25, 2025

(54) METHOD FOR DETECTING AND/OR TRACKING MOVING OBJECTS WITHIN A CERTAIN ZONE AND SPORTS VIDEO PRODUCTION SYSTEM IN WHICH SUCH A METHOD IS IMPLEMENTED

(71) Applicant: MOBILE VIEWPOINT B.V., Alkmaar (NL)

(72) Inventors: Michael Stuurman, Arnhem (NL); Michel Alexander Bais, Enkhuizen (NL)

(73) Assignee: MOBILE VIEWPOINT B.V., Alkmaar (NL)

( * ) Notice: Subject to any disclaimer, the term of this patent is extended or adjusted under 35 U.S.C. 154(b) by 387 days.

(21) Appl. No.: 18/003,322

(22) PCT Filed: Jun. 22, 2021

(86) PCT No.: PCT/NL2021/050393
§ 371 (c)(1),
(2) Date: Dec. 26, 2022

(87) PCT Pub. No.: WO2021/261997
PCT Pub. Date: Dec. 30, 2021

(65) Prior Publication Data
US 2023/0252653 A1      Aug. 10, 2023

(30) Foreign Application Priority Data
Jun. 26, 2020   (NL) ..................... 2025923

(51) Int. Cl.
*G06T 7/292*    (2017.01)
*G06T 7/215*    (2017.01)

(52) U.S. Cl.
CPC .............. *G06T 7/292* (2017.01); *G06T 7/215* (2017.01); *G06T 2207/10016* (2013.01); *G06T 2207/20081* (2013.01)

(58) Field of Classification Search
None
See application file for complete search history.

(56) References Cited

U.S. PATENT DOCUMENTS 8,355,042 B2 *   1/2013   Lablans ................. H04N 25/41
                                                        348/46
2014/0300687 A1   10/2014  Gillard et al.
(Continued)

OTHER PUBLICATIONS

Fast and accurate object detection using image cropping/resizing in multi-view 4K sports video by Xu et al. MMSports'18, Oct. 26, 2018, Republic of Korea, pp. 97-103 (Year: 2018).*

(Continued)

*Primary Examiner* — Vikkram Bali
(74) *Attorney, Agent, or Firm* — Tatonetti IP

(57) ABSTRACT

A method for detecting moving objects within a certain zone that includes initially providing multiple physical cameras around the zone and composing a panoramic video stream using the cameras. Upon composing the panoramic video stream, one or more virtual camera views are defined by selecting corresponding partial views of the panoramic views and by de-warping the selected, partial views into square views. Each de-warped view is fed into a deep learning neural network and then a corresponding part of the zone is detected.

12 Claims, 9 Drawing Sheets

(56) References Cited

U.S. PATENT DOCUMENTS

2015/0271401 A1* 9/2015 Khoury .................. H04N 5/232
2020/0404174 A1* 12/2020 Taxbøl .................. H04N 23/90

OTHER PUBLICATIONS

International Search Report mailed Dec. 30, 2021 issued in connection with International Application No. PCT/NL2021/050393 (3 pages total).
Written Opinion of the International Searching Authority issued Dec. 30, 2021 issued in connection with International Application No. PCT/NL2021/050393 (6 pages total).
MMSports'18: Proceedings of the 1st International Workshop on Multimedia Content Analysis in Sports, Jianfeng et al., "Fast and Accurate Object Detection Using Image Cropping/Resizing in Multi-View 4K Sports Videos", pp. 97-103, Oct. 2018 (URL: https://dl.acm.org/doi/10.1145/3265845.3265852) (Abstract enclosed).

* cited by examiner

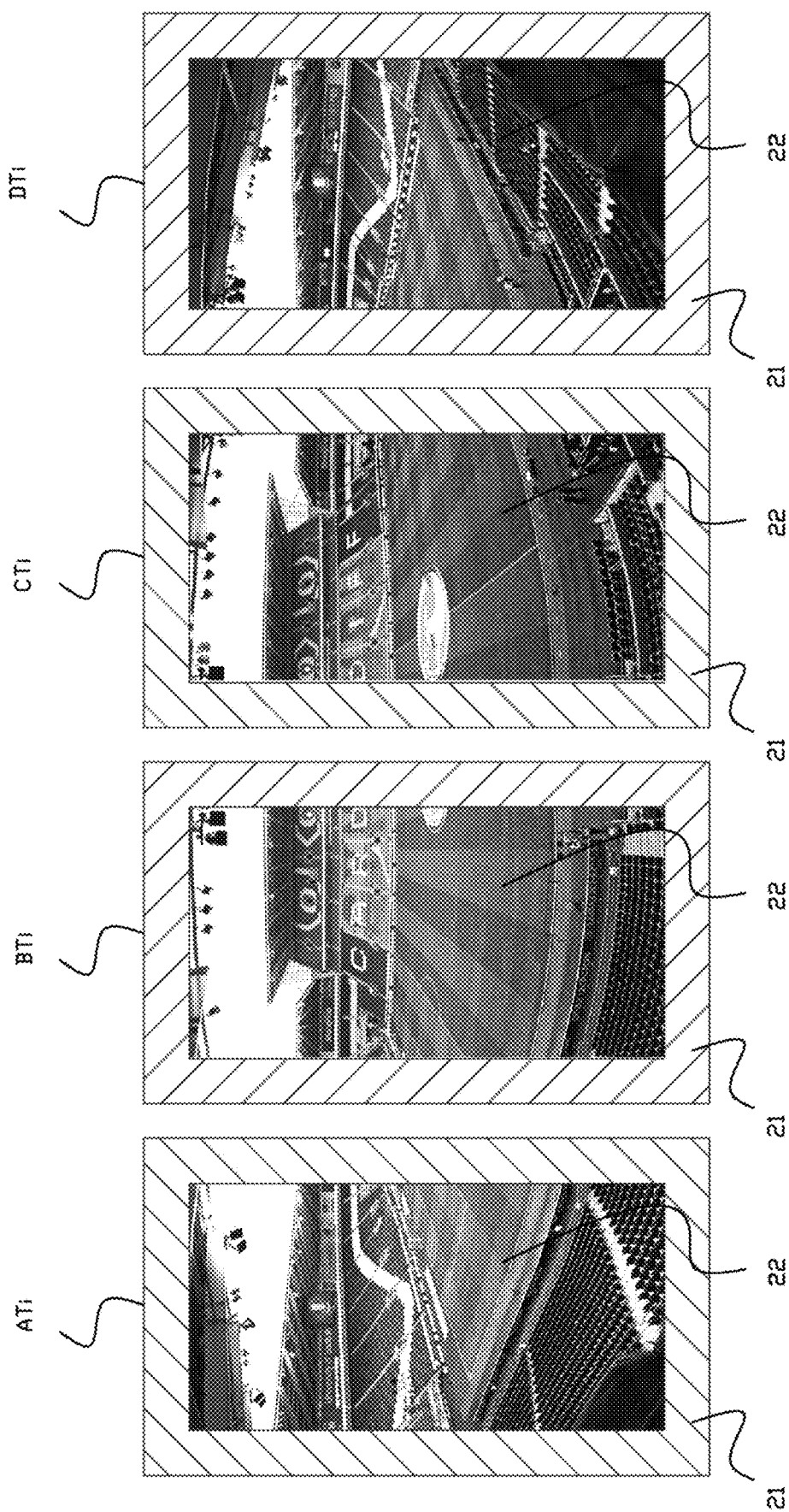

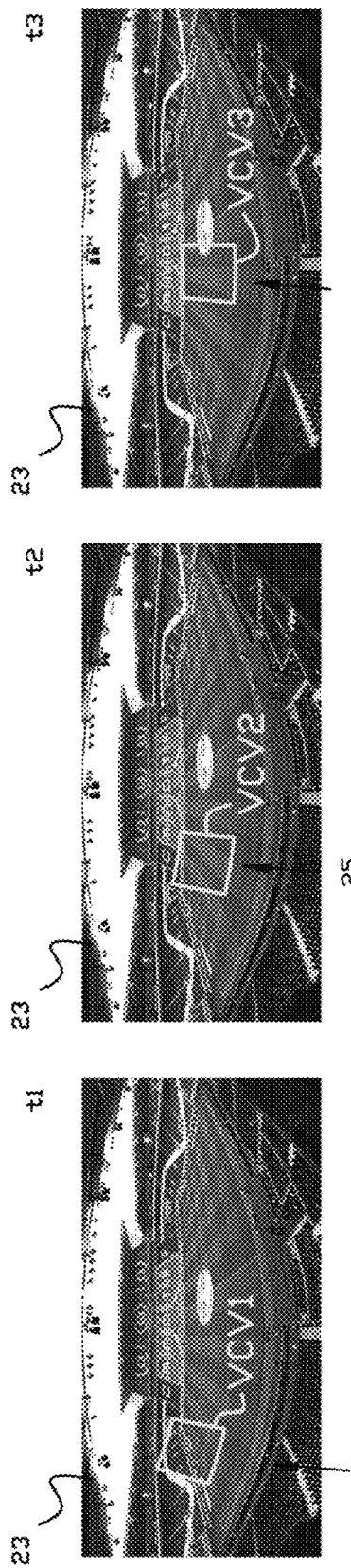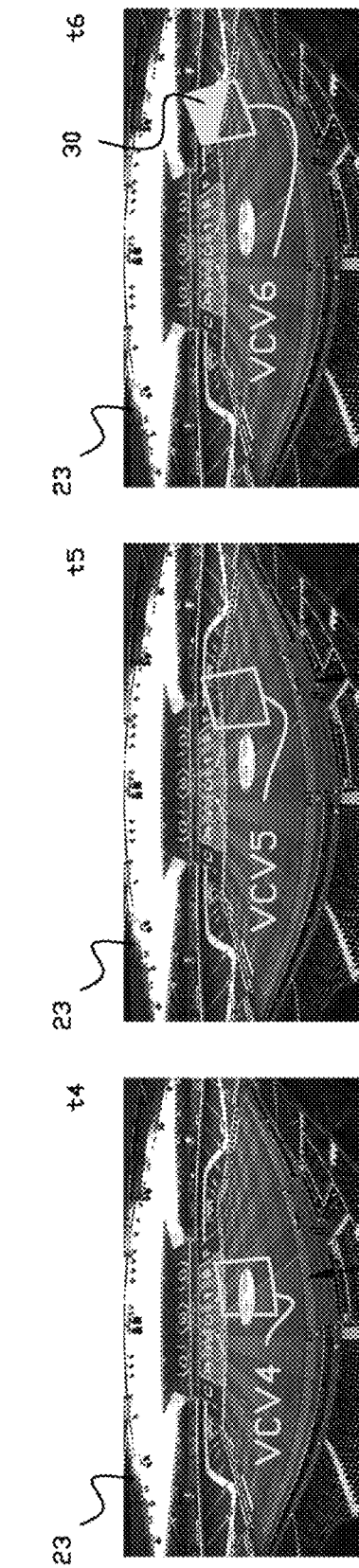

METHOD FOR DETECTING AND/OR TRACKING MOVING OBJECTS WITHIN A CERTAIN ZONE AND SPORTS VIDEO PRODUCTION SYSTEM IN WHICH SUCH A METHOD IS IMPLEMENTED

CROSS-REFERENCES TO RELATED APPLICATIONS

This Non-Provisional Patent Application is a National Stage application that claims the benefit of and priority to PCT Application Serial No. PCT/NL2021/050393, filed Jun. 22, 2021, entitled "METHOD FOR DETECTING AND/OR TRACKING MOVING OBJECTS WITHIN A CERTAIN ZONE AND SPORTS VIDEO PRODUCTION SYSTEM IN WHICH SUCH A METHOD IS IMPLEMENTED," which claims the benefit of and priority to Netherlands Patent Application Serial No. 2025923, filed Jun. 26, 2020, entitled "METHOD FOR DETECTING AND/OR TRACKING MOVING OBJECTS WITHIN A CERTAIN ZONE AND SPORTS VIDEO PRODUCTION SYSTEM IN WHICH SUCH A METHOD IS IMPLEMENTED," the entirety contents of both applications of which are hereby incorporated herein by reference.

BACKGROUND

The present invention relates in first instance to a method for detecting and/or tracking moving objects within a certain zone.

Without restricting the invention to this example, a method according to the invention is especially interesting for detecting and/or tracking moving objects, such as a ball and/or one or more players on a sports pitch during a sports event.

The invention also relates to a sports video production system for automatically creating one or more output video streams on the basis of one or more input video streams for displaying a sequence of events taking place within a zone, such as events during a sports game which take place on a sports pitch. Such a sports video production system in accordance with the invention comprises computing means which implement in an automatic way an afore-mentioned method.

Methods for detecting and/or tracking one or more objects in a zone as well as sports video production systems which make use of such a method already exist. However, the performance is often not very high.

For example, several companies make the mentioned kind of sports video production systems, but these systems all have issues with choosing and creating accurate images of the situation or events that take place and as a consequence with finding the ball on the sports pitch.

The known methods used for detecting and/or tracking a moving object, such as a ball, apply mostly solutions which include image recognition techniques to detect the moving object or ball. Such image recognition techniques usually involve background subtraction leaving an image with only the moving parts. An important disadvantage of these image recognition techniques is that they are rather sensitive for falsely recognizing smaller moving objects like a ball, leading to so-called false positives. As a result, in known sports video production systems which use these image recognition techniques, it is not exceptional to observe a phenomenon wherein the video output is showing totally irrelevant scenes, such as parts of the sports pitch lacking the ball and missing the actual scene of action.

In some known solutions of sports video production systems the detection algorithms are therefore mainly focused on detection of the players in largely zoomed-out images of the sports pitch and not on detection of the ball, whereas in sports games the ball is of course the most important object to find and track.

An additional reason why the known methods for detecting and tracking a moving object are often not capable of accurately tracking smaller objects such as a ball, is that the images recorded with physical cameras for detection are in itself often already a very deformed representation of the reality. Moreover, prior to being fed to the actual detection algorithms, these recorded images often undergo a further transformation, which usually increases the deformation from reality even more, resulting in a poor detection accuracy or capability.

Another disadvantage of the known methods for detecting and/or tracking a moving object and of sports video production systems based on such methods is that the used algorithms are not very efficient, require a lot of iterations, resulting in high memory use and in a need for high calculation capacity.

SUMMARY

The present invention aims at a method for detecting and/or tracking moving objects within a certain zone and a sports video production system in which such a method is implemented, which do not show one or more of the above-mentioned disadvantages and possibly also other disadvantages.

In particular, it is an aim of the invention to provide such a method that is also capable of detecting and tracking of a fast moving, small object, such as a ball on a sports pitch, and this in a very accurate and efficient way, requiring only relatively limited resources and computing capacity.

A method of the invention is of course also suitable for detecting other moving objects than a ball, such as players on sports pitch.

Another aim of the invention is to provide a sports video production system with improved capacity for automatically selecting relevant and/or by a viewer desired camera views on different stages during a sports event.

To this aim, the invention relates in first instance to a method for detecting and/or tracking moving objects within a certain zone, such as a ball and/or one or more players on a sports pitch, the method comprising at least the following steps of:

providing multiple physical cameras around the zone which are synchronised for, successively at regular instances after one another, taking simultaneously at every such instance a set of video frame images of the zone which form input video streams when put in a video sequence after one another, wherein the totality of video frame images of a set made at such an instance jointly cover at least the total area of the zone;

composing a sequence of panoramic views of the zone so to form a panoramic video stream by cutting away overlapping parts of the video frame images of each set and stitching together remaining parts of the video frame images of each set;

defining one or more virtual camera view(s) by selecting for each virtual camera view a corresponding partial or entire view of the panoramic views and by de-warping the selected, partial or entire views into square views or views with another geometry which form a projection of a corresponding part of the zone;

feeding each of the square, de-warped views or de-warped views with another geometry to a deep learning neural network or an AI-network so to form a corresponding virtual detector; and, performing a detection with the virtual detectors so to determine the presence or absence of objects in the corresponding part of the zone and possibly their type or class and their location in that part.

Preferably, the corresponding partial views are de-warped into square views or views with another geometry, after having made the selection of virtual camera views. Alternatively, or additionally, the corresponding partial views may be de-warped into square views or views with another geometry, before and/or during making the selection of virtual camera views.

In different embodiments, cutting away overlapping parts may comprise different ways of, partly or completely, removing or adapting a part of a video frame image that overlaps with another video frame image. Cutting away overlapping parts preferably comprises determining which image parts of the overlapping images will be included, in a region of overlap, in the panoramic view. Preferably, the step of composing a sequence of panoramic views of the zone so to form a panoramic video stream is carried out by combining the video frame images of each set.

A first part of this method in accordance with the invention is that with multiple physical cameras accurate input video streams are captured which cover at least the entire zone in which objects must be detected and that these input video streams are transformed into a panoramic video stream which serves as the basic video stream for further processing in the detection method.

A first important advantage of such a method is that an accurate panoramic overview is obtained with physical cameras, which contributes to the accuracy of the detection method. Furthermore, the remaining steps of the method are basically computations on the images captured with the physical cameras, so that essentially no further time and energy consuming manipulations of the physical cameras itself are required, resulting in a method with increased speed.

Indeed, in a further step of a method in accordance with the invention one or more virtual camera view(s) are defined by selecting for each virtual camera view a corresponding partial or entire view of the panoramic views.

An advantage of such a method is that virtual camera views can be defined at desire. The size of the selected virtual camera view can for example be chosen at random as well as a certain zoom factor. Furthermore, a part of the panoramic view can be selected which in reality is recorded by multiple physical cameras, without having to reorientate any of the physical cameras.

A further part of a method of the invention consists of de-warping the selected, partial or entire views into square views or views with another geometry and to feed each of the square, de-warped views or de-warped views with another geometry to a deep learning neural network or an AI-network so to form a corresponding virtual detector. Dependent on the aspect ratio, the used AI algorithm or the specific content another geometry than a square geometry can be chosen for the de-warped views.

This is a very important part, if not the most important part of the method in accordance with the invention, resulting in very efficient detection of objects.

By de-warping the selected, partial or entire (panoramic) views into square, de-warped views, or de-warped views with another geometry, deformation present in the selected parts of the panoramic views is tremendously decreased. Indeed, panoramic views are typically obtained by a central or geometric projection, such as a equirectangular projection in which a lot of deformation, such as curving of straight lines, is involved. In the de-warping process the original projection is essentially transformed into another projection, which is typically a rectilinear projection, so that for example curved lines in the panoramic views are de-warped into straight lines in the square, de-warped views, which straight lines also correspond to straight lines in the real world. It may thus be clear that, in embodiments, de-warping a selected partial or entire view may generally be carried out before, during, and/or after selecting the partial or entire view. For example, the entire panoramic view may be de-warped before the selecting. De-warping a selected partial or entire view after, or at least partly after, selecting the partial or entire view, enables reaching a computational advantage as de-warping may be limited to the selected view, or at least de-warping of a portion of the entire panoramic view may be omitted.

Another important aspect of this part of the method of the invention is that the de-warped views have a square shape. By these measures the selected virtual camera views are optimized for being analysed by a deep learning neural network or "Artificial Intelligence"-network so to form a virtual detector, resulting in a much better detection of objects than is the case with the known methods.

In a preferred method in accordance with the invention the panoramic views represent an equirectangular projection or other geometric projection of the zone and possible surroundings and the de-warped, selected views represent rectilinear projections of the concerned part of the zone. As explained before, an advantage of such a method is an increased quality of the detection due to less deformation in the images presented to the concerned deep learning neural network.

In another preferred method in accordance with the invention the deep learning neural network or AI-network is a convolutional neural network (CNN) and even more preferred it is a part of a YOLO ("You Look Only Once")-detection system.

In the domain of artificial intelligence and deep learning a so-called classification problem is considered to be the problem of predicting which type or class of object is represented in a certain image. An object detection problem however is defined as the problem of predicting which classes of objects are represented in the image as well as at which location (within a boundary box) these objects are positioned.

A convolutional neural network or CNN is traditionally mainly used for classification of images. When an image is fed to the CNN, filters are convoluted over the image in order to highlight certain features in the image. As a result, a stack of filtered images is obtained forming a first convolutional layer. By repetition of this process deeper convolutional layers of the CNN are obtained. Other calculation techniques are used such as pooling for reducing the image size stack, normalisation in order to eliminate negative values, resulting in still other layers of the CNN. The final layer of a CNN is the so-called "fully connected layer" in which each value in the preceding layer gets a vote, so that essentially an array of votes is obtained. Dependent on which image is fed to the CNN the votes in the fully connected layer will change. When the image is representing or contains a certain first feature or class of object, this will result in high votes at certain positions in the fully connected layer, while for images representing or containing another feature or class of object the high votes will be at other positions in the fully connected layer. So, based on the values present in the fully connected layer an estimation can be made of what the image is actually representing. By feeding the CNN with images containing an object of a known class the resulting estimation error can be calculated. A CNN is furthermore designed to gradually adapt the way it composes its different layers in order to minimize said estimation error. This process is what is called the training of the AI-network or the learning process. When such a CNN is used for detection of an object in an image, i.e. for finding the actual location of the object in the image, the process of classification is repeated over and over again for different boundary boxes in the image. This however requires a lot of computing capacity and time.

A so-called YOLO-detection system uses another approach by localising and classifying objects in the image at the same time. The image is divided into a grid and for each grid cell a certain fixed number of boundary boxes is constructed and a prediction or estimation is made regarding the presence of an object of a certain class in these boundary boxes. Each boundary box is given a boundary box confidence score which reflects how likely the concerned boundary box contains an object and how accurate the boundary box is. For each class of objects in training and for each boundary box also a classification score is calculated. In short, for each grid cell a certain number of boundary boxes is considered which are all given a boundary box confidence score as well as a classification score for each class. This requires quite a lot of estimation effort. However, for most of the boundary boxes the combination of boundary box confidence score and classification score will result in a very low overall confidence score. By setting a threshold of say 30% overall confidence score, most of the boundary boxes are very quickly eliminated. For the made estimations a YOLO-detection system also uses a CNN. A great advantage of YOLO however is that for detection of objects in images the parts of the image are fed to the CNN only once and all at the same time. This makes YOLO very suitable for run time detection and for detection in video streams.

A great advantage of the present invention is that the images fed to the YOLO-detection system are well prepared and optimized for being treated by such a trained YOLO-detection system, which is not the case with the techniques available at present.

The present invention also relates to a sports video production system for automatically creating one or more output video streams on the basis of one or more input video streams for displaying a sequence of events taking place within a zone, such as events during a sports game which take place on a sports pitch.

It is characteristic for the invention that such a sports video production system is provided with computing means which implement a method in accordance with the invention as explained above and which additionally define in an automated way virtual camera views for composing the one or more output video streams by selecting, based on the detection of objects in preceding steps of the implemented method, for each output video stream a corresponding partial or entire view of each of the panoramic views.

Since the method for detecting and tracking objects used by such a sports video production system of the invention is better performing, allowing for example for an accurate detection and tracking of a ball on a sports pitch, the output video streams delivered by such a sports video production system of the invention are more relevant, are of a much higher quality and the occurrence of errors is very much reduced, than is the case with known sports video production systems. For example, by being capable of better tracking the ball it is possible to keep a more zoomed-in view on the actual scenes of action during the sports game.

In a preferred embodiment of a sports video production system of the invention the computing means implement a method, wherein, after detection of objects, the detected configuration of objects is fed to a detection algorithm or a deep learning neural network for recognizing interesting situations or events and wherein, based on such a recognition, one or more virtual camera views are defined.

Such an embodiment of a sports video production system of the invention is provided with even more intelligence so that it is capable of detecting situations such as a restart of the game after a player committed a foul or scored a goal, a goalkeeper taking or kicking out the ball, an intervention of a referee, etc . . . Based on such additional information, the relevance and the quality of the produced output video streams can even still more be improved by choosing the appropriate virtual camera views.

In another preferred embodiment of a sports video production system of the invention the computing means implement a method, wherein information about positions in the real world is linked to fixed positions in the panoramic views and is taken into account for defining interesting virtual camera views.

In a preferred embodiment, an object to be detected and/or tracked by the method is a ball and/or one or more players, and the zone is a sports pitch.

With the intention of better showing the characteristics of the present invention, hereafter, as an example without any restrictive character whatsoever, some preferred embodiments of a sports video production system of the invention and of a method of the invention for detecting and/or tracking moving objects within a certain zone, are described, with reference to the accompanying illustrations.

BRIEF DESCRIPTION OF THE DRAWINGS

FIGS. 3 to 6 represent a set of video frame images produced by the set of physical cameras of FIG. 2;

FIGS. 13 to 18 respectively represent consecutive virtual camera views which are respectively indicated by F13 to F18 in FIG. 12;

DETAILED DESCRIPTION

Figure 1:
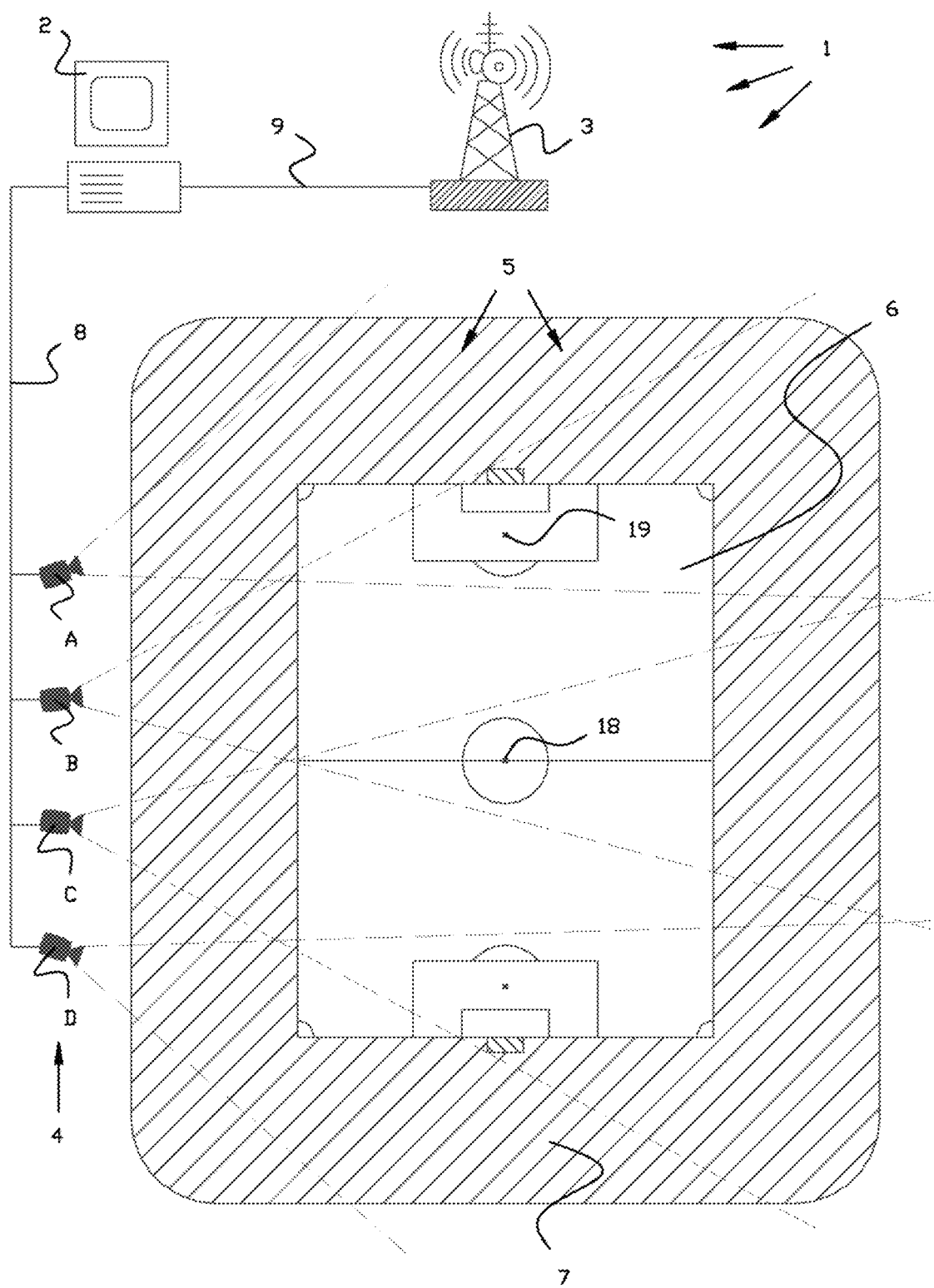
FIG. 1 is a schematic representation of a possible embodiment of a sports video production system in accordance with the invention.

The sports video production system 1 in accordance with the invention illustrated in FIG. 1 is provided with computing means 2 which are connected to a broadcasting system 3. The sports video production system 1 also comprises a set of physical cameras 4, which comprises in the represented case four physical cameras A to D and which are positioned around a zone 5, which is in this example a sport pitch or soccer field 6 surrounded by a grandstand 7.

The physical cameras A to D provide input for the computing means 2 in the form of multiple input video streams 8. The computing means 2 of the sports video production system 1 are intended for automatically creating one or more output video streams 9 based on the input video streams 8 which are further transmitted to the broadcasting system 3 for broadcasting to viewers. The output video streams 9 should of course display the relevant events taking place on the sports pitch 6 during the soccer game.

For that reason, on the computing means 2 software is turning which implements a method in accordance with the invention for detecting and tracking moving objects within the zone 5. In the case of a soccer game, the most important moving object to be detected and tracked is obviously the ball 10, while also other moving objects such as the soccer players 11, the referees 12 are rather important. Additionally, also knowledge about the exact position of fixedly positioned objects on the soccer field 6, such as the goals 13, the soccer field borders 14 and corners 15, the half-way line 16, the centre circle 17, the centre spot 18, the penalty spot 19 and so on can play an important role, when a good camera view is sought for capturing a relevant scene during the soccer game.

A few possible methods in accordance with the invention for detecting and tracking the afore-mentioned objects and which can be implemented on the computing means 2, will now be described in more detail.

Figure 2:
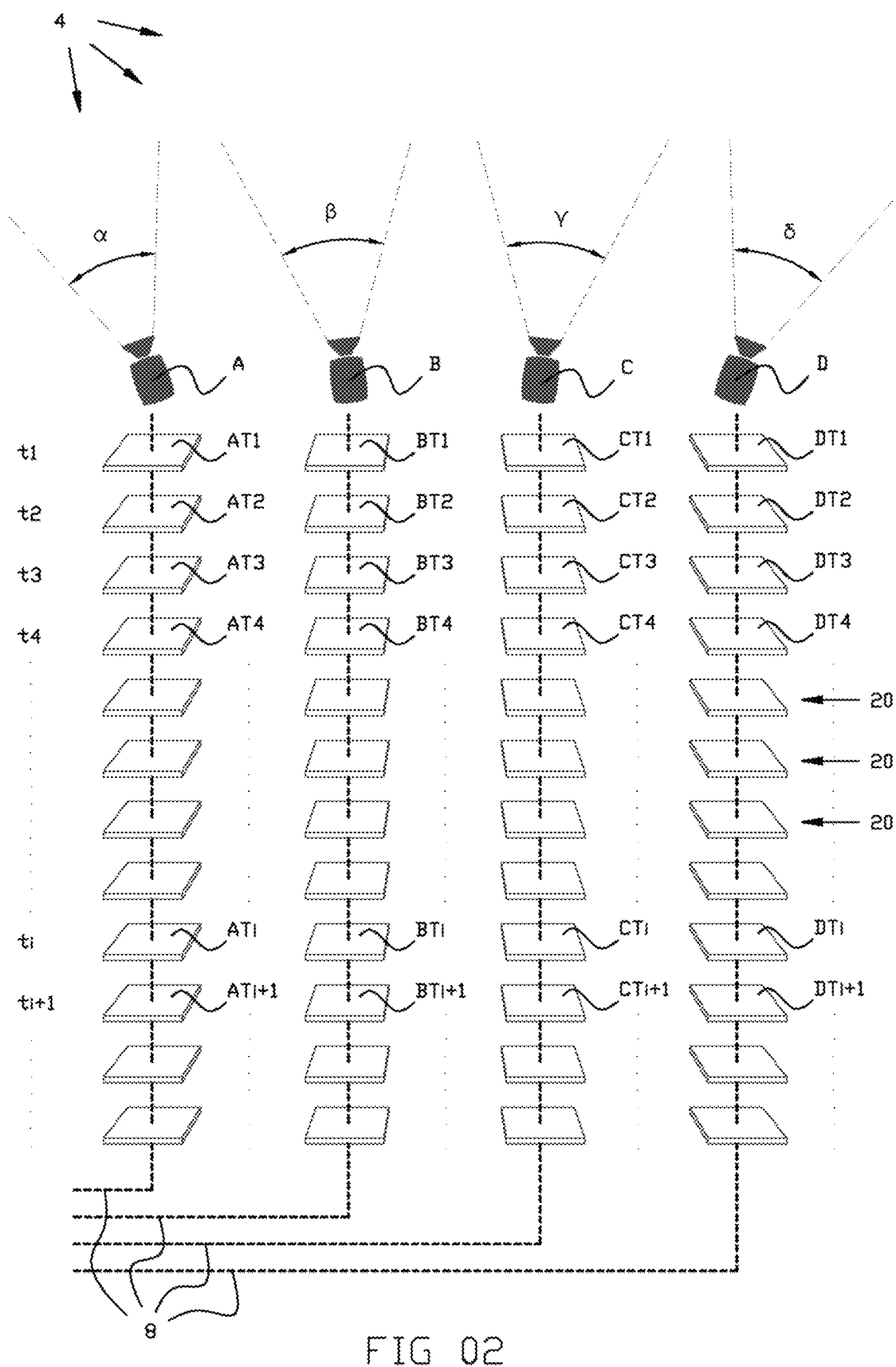
FIG. 2 is a schematic representation of input video streams produced by a set of physical cameras.
Figure 7:
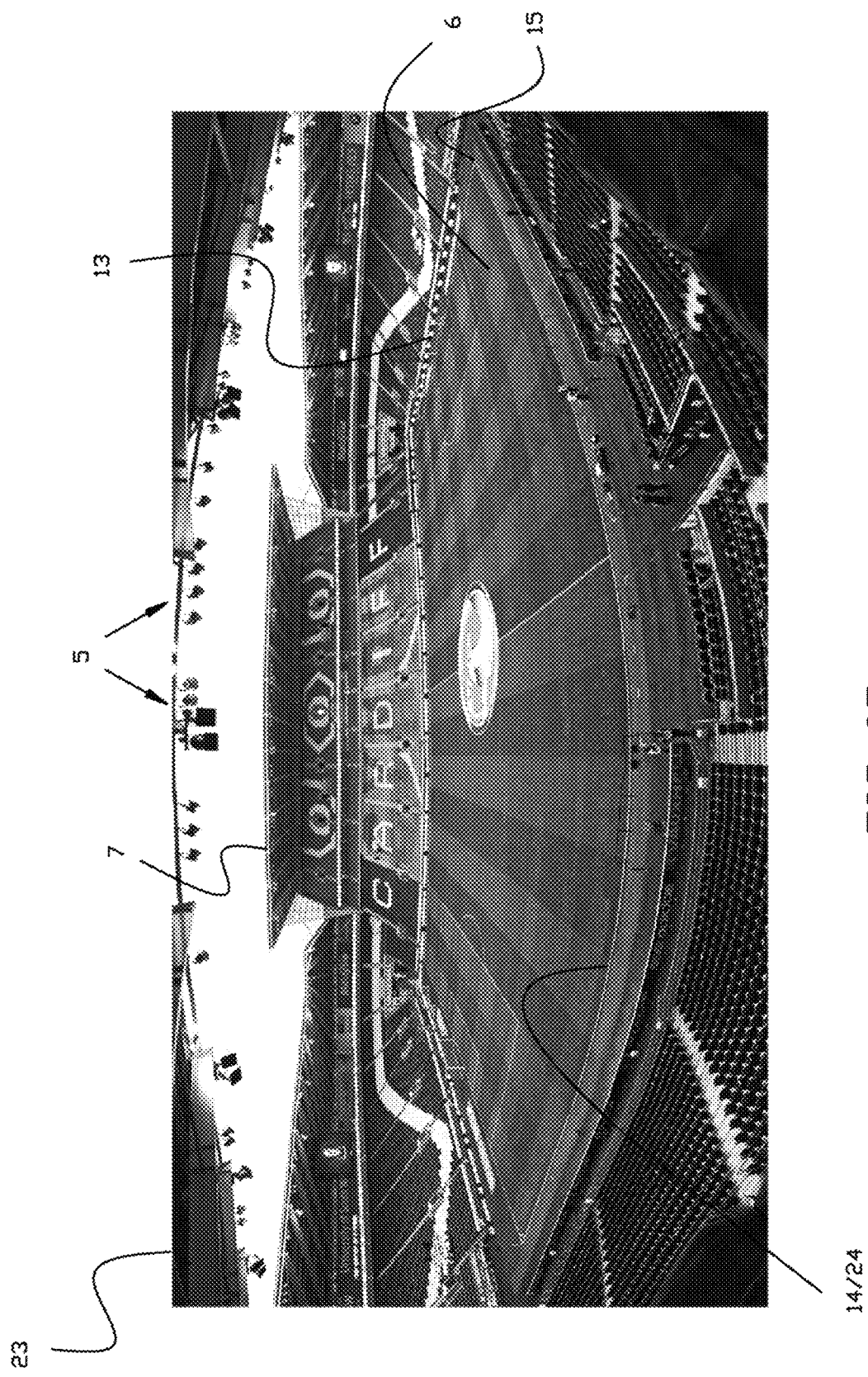
FIG. 7 is a panoramic view composed with the set of video frame images of the FIGS. 3 to 6.

As is illustrated by means of FIG. 2, the physical cameras A to D around the zone 5 wherein the detection and tracking has to take place are synchronised. This means that the physical cameras A to D take successively at regular instances t1, t2, t3, . . . , ti, ti+1, . . . after one another and simultaneously at every such instance t1, t2, t3, . . . , ti, ti+1, . . . a set 20 of video frame images ATi, BTi, CTi and DTi of the zone 5. These sets 20 of video frame images ATi, BTi, CTi and DTi form input video streams 8 when put in a video sequence after one another. The physical cameras A to D have each a sufficient wide angle of view α, β, γ and δ so that the totality of video frame images ATi, BTi, CTi and DTi of a set 20 made at such an instance t1, t2, t3, . . . , ti, ti+1, . . . jointly cover at least the total area of the detection zone 5.

In that way, a first processing step of the method of the invention can be executed, as is illustrated by means of FIGS. 3 to 7. In this first processing step overlapping parts 21 of the video frame images ATi, BTi, CTi and DTi of each set 20 are cut away and the 22 remaining parts of the video frame images ATi, BTi, CTi and DTi are stitched together in order to form panoramic views 23 of the detection zone 5, an example of which being represented in FIG. 7. It may be clear that cutting away overlapping parts may comprise different ways of, partly or completely, removing or adapting a part of a video frame image that overlaps with another video frame image. Naturally, where two video frame images overlap, the method will not involve removing completely the overlapping parts of both images, as this would lead to loss of information and hinder creating a panoramic view. Cutting away overlapping parts may comprise determining which image parts of the overlapping images will be included, in a region of overlap, in the panoramic view. By putting the obtained panoramic views 23 of each set 20 in a sequence after one another a sequence of panoramic views 23 is obtained which forms a panoramic video stream. It is clear that in the example of the FIGS. 3 to 7 no game is yet started and no ball 10 nor players 11 and referees 12 are yet present on the soccer field 6. As can be deduced from FIG. 7, the panoramic views 23 are obtained by an equirectangular projection or other geometric projection of the detection zone 5, a lot of deformation being clearly visible. For example, the soccer field borders 14, which are in the real-world straight lines, are transformed by such a projection in curved lines 24.

Figure 8:
FIG. 8 illustrates a possible selection of virtual camera views on the panoramic view of FIG. 7.
Figures 9, 10:
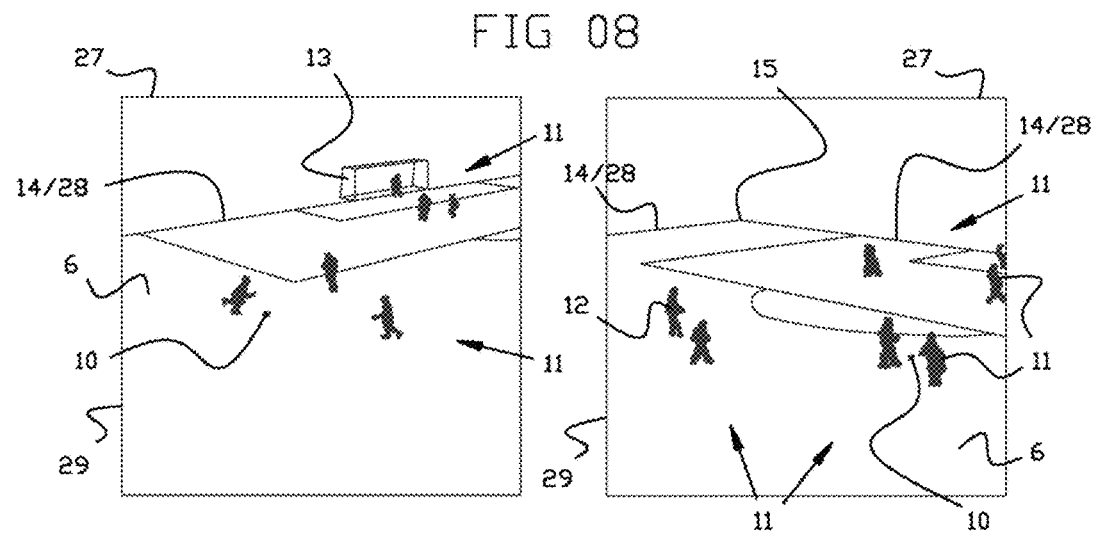
FIGS. 9 to 11 represent square, de-warped views during a sports game of the corresponding virtual camera views respectively indicated by F9 to F11 in FIG. 8.
Figure 11:
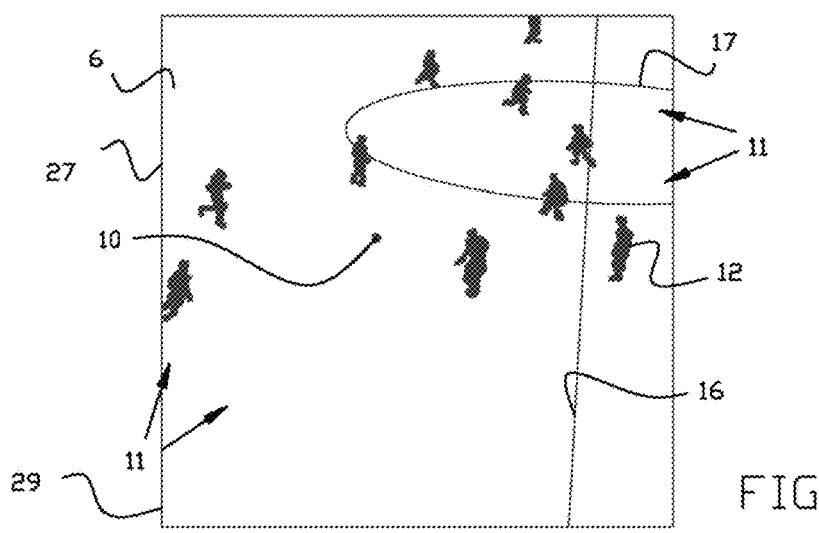

In a next step of a method of the invention, which is illustrated by means of FIG. 8, one or more virtual camera views 25 are defined by selecting for each virtual camera view 25 a corresponding partial or entire view 26 of the panoramic views 23. In the example of FIG. 8 only three such partial views 26 of the panoramic views 23 are selected, but this is not necessarily the case according to the invention, as will be illustrated further in the text. The chosen partial views 26 or virtual camera views 25 can remain the same for an entire sequence of panoramic views 23, but the selection can be modified and in many practical cases should be modified during the processing of the panoramic video stream. This will also be clarified somewhat more, further in the text. Preferably after having made this selection of virtual camera views 25, the corresponding partial views 26 are, according to the invention, de-warped into square views 27, which are in this example represented in FIGS. 9 to 11. These de-warped views 27 also form a projection of a corresponding part of the detection zone 5 or soccer field 6 and possible surroundings, such as the grandstand 7. Preferably, the de-warped, selected views 27 represent rectilinear projections of the concerned parts in the real-world, so that deformation present in the panoramic views 23 is very much reduced and so that straight lines in the real-world, such as the soccer field borders 14, are still represented by straight lines 28 in the de-warped, selected views 27. The de-warped, selected views 27 preferably also have a square shape 29. In that way, the views 27 are prepared and optimized for use in a next step of the method of the invention.

In this next step of a method of the invention each of the square, de-warped views 27 are fed to a deep learning neural network or an AI-network so to form a corresponding virtual detector. Such a deep learning neural network, which is preferably part of a YOLO ("You Look Only Once")-detection system, can for example be included in the software installed on the computing means 2. With these virtual detectors a detection is performed, so to determine the presence or absence of objects, such as the ball 10, the players 11 and referee 12, in the corresponding part 27 of the zone 5 and possibly their type or class and their location in that part 27. As explained in the introduction, the detection of these objects is with a method according to the invention much better than with the existing methods due to the fact that the neural network is fed with images that are transformed into an appropriate format suitable for being processed by such neural network. After all, by de-warping the selected, partial or entire (panoramic) views into square, de-warped views, deformation present in the selected parts of the panoramic views is tremendously decreased. This results in very efficient detection of objects. For example, an object in a de-warped image may be better detectable by means of a deep learning neural network or an AI-network, because de-warping may diminish, or may substantially prevent, deformation of said object that is to be detected.

Furthermore, the software of the sports video production system 1 is preferably such that it additionally defines in an automated way virtual camera views 25 for composing the one or more output video streams 9. Preferably, the software can select, based on the detection of objects in preceding steps of the afore-described method of the invention, for each output video stream 9 a corresponding partial or entire view 26 of each of the panoramic views 23. Even more preferably, the software is capable of recognizing interesting situations or events, based on the detection of objects with the described method, and of automatically defining one or more virtual camera views 25 based on recognition of such a situation. In that way a very dynamic selection of relevant virtual camera views 25 during the sports game is realized. It is clear that the virtual camera views 25 for detecting the objects are not necessarily the same virtual camera views 25 chosen for composing the output video streams 9. They can have a complete other size, zoom factor, position, view angle, projection method, etc . . . all prepared during a computing process without having to manipulate the physical cameras A to D at all.

In the example illustrated in the FIGS. 8 to 11 three virtual camera views 25 were rather randomly chosen, which were all three processed at the same time. When a detection and/or tracking of objects must be performed on a large area or the entire area of the zone 5, which is typically the case during a sports even, this can lead to retardation in the output video streaming 9 due to the needed processing time.

In order to solve such problems with the speed of processing an alternative method in accordance with the invention can be applied, as is illustrated by means of FIGS. 12 to 18.

In general terms in this method a total number N bigger than 1 of virtual camera views 25 is chosen for covering the complete zone 5. The detection of objects in the entire zone 5 is realised by feeding at each of the instances t1, t2, t3, . . . , ti a restricted number M, i.e. 1 or a number M smaller than the total number N, of virtual camera views 25 to the deep learning neural network or AI-network or virtual detector. Hereby it is ensured that after a certain number of instances t1, t2, t3, . . . , ti the total number N of virtual camera views 25 has been fed to the deep learning neural network or AI-network or virtual detector. In that way, detection is performed on the total zone 5, while the feed to the deep learning neural network or AI-network or virtual detector at every instance t1, t2, t3, . . . , ti is kept at a very low level.

Figure 12:
FIG. 12 illustrates another possible selection of virtual camera views on the panoramic view of FIG. 7, the totality of virtual camera views covering this time the entire sports pitch.

In the example of FIG. 12 a total number N of 14 virtual camera views 25, numbered VCV1 to VCV14, is selected, covering the entire zone 5 in which a detection has to be performed. Virtual camera view VCV1 is fed for processing at instance t1 to the virtual detector, as illustrated in FIG. 13. Virtual camera view CVC2 is sent for processing at instance t2, which is illustrated in FIG. 14. In a similar way, a detection sequence is composed wherein a detection is performed at each instance ti an a corresponding virtual camera view VCVi and wherein the cycle is repeated after the last virtual camera view VCV14 has been subjected to a detection.

In case the cameras A to D record 50 sets 20 of video frame images ATi, BTi, CTi and DTi per second, this means that every virtual camera view VCV1 to VCV 14 is subjected to a detection each 0,28 seconds. As a consequence, objects are detected in the entire zone 5 without overloading the system.

A particular method of the invention can be used in order to avoid the ball 10 is lost during detection. In this method an additional virtual camera view VCVb is added to the detection sequence as soon as the ball 10 has been detected. Such a virtual camera view VCVb is preferably centred around the ball 10 and zoomed-in on the ball 10. Directly after defining this virtual camera view CVCb the detection sequence is changed, for example as follows: VCV1, VCVb, VCV2, VCVb, VCV3, VCVB, This means that the standard detection sequence, wherein successive virtual camera views VCVi are presented one after another to a virtual detector is changed into a modified detection sequence. In the modified detection sequence, after each detection on a virtual camera view CVCi, first a detection is executed on the virtual camera view VCVb that surrounds the ball 10, before continuing with the next virtual camera view CVCi+1. It is clear that by detecting the ball 10 more often, a better detection of the ball 10 is realised. Of course, according to the invention, many other kinds of detection sequences and other kinds of additional virtual camera views can be applied in order to get the best and desired result.

With another method in accordance with the invention it is possible to reduce the processing time and effort during detection even more. In such a method, a part of one or more of the virtual camera views VCVi, VCVb, corresponding to a part 30 falling out of the zone 5 to be detected, is masked before being fed to a virtual detector, so that detection speed and quality is increased.

These masks can be changed in real time based on external input, e.g. user interface, or the AI algorithm signaling false positives.

In general terms, in a method according to the invention virtual camera views 25 can be chosen and adapted in a wide variety of ways.

For example, in a first method in accordance with the invention the virtual camera views 25 can be defined and can remain static during detection.

In another method in accordance with the invention virtual camera views 25 can be defined and changed dynamically during detection.

For example, a virtual camera view 25 can be added or removed during detection.

In another example, a virtual camera view 25 can be modified or added for capturing another part of the detection zone 5.

In still another example, a zoom factor of a virtual camera view 25 can be adapted.

In a particularly interesting method in accordance with the invention virtual camera views 25 are dynamically adapted in such a way that one or more virtual camera views 25 are added or modified in order to create a centred or more or less centred view and/or a zoomed-in or zoomed-out view around a previously detected object, such as a ball 10 or a situation.

An even still more interesting method in accordance with the invention makes use of an algorithm that modifies and adds and removes one or more virtual camera views 25 during detection, so to track a previously detected object.

Another very interesting method in accordance with the invention uses an algorithm which comprises and applies a so-called "look ahead"-function. In such a method, sets 20 of video frame images ATi, BTi, CTi and DTi or parts thereof, taken at consecutive instances t1, t2, t3, . . . , ti, ti+1, . . . by the physical cameras A to D, are buffered in a memory. Furthermore, an object is first detected with one or more virtual camera views 25 in a later set 20 of video frame images ATi, BTi, CTi and DTi for example at instance ti. After detection of the object, one or more virtual camera views 25 are defined for intermediate sets 20 of video frame images, for example for video frame images taken between t1 and ti−1. These virtual camera views 25 are determined as a function of the detection of the object or objects in the later set 20 of video frame images ATi, BTi, CTi and DTi.

With such a look-ahead function, it is possible to predict where for example the ball 10 or an interesting scene will be in the near future. The look-ahead function also protects against not detecting an object, such as a fast moving and small object as a ball 10, during a couple of frames, due to occlusion or for other reasons which result in difficult detections. Knowing the location of the object or situation to detect in advance, can render the dynamic adaptation of virtual camera views 25 more smoothly and naturally, not only for detection purposes, but even more for composing relevant output video streams 9.

Figure 19:
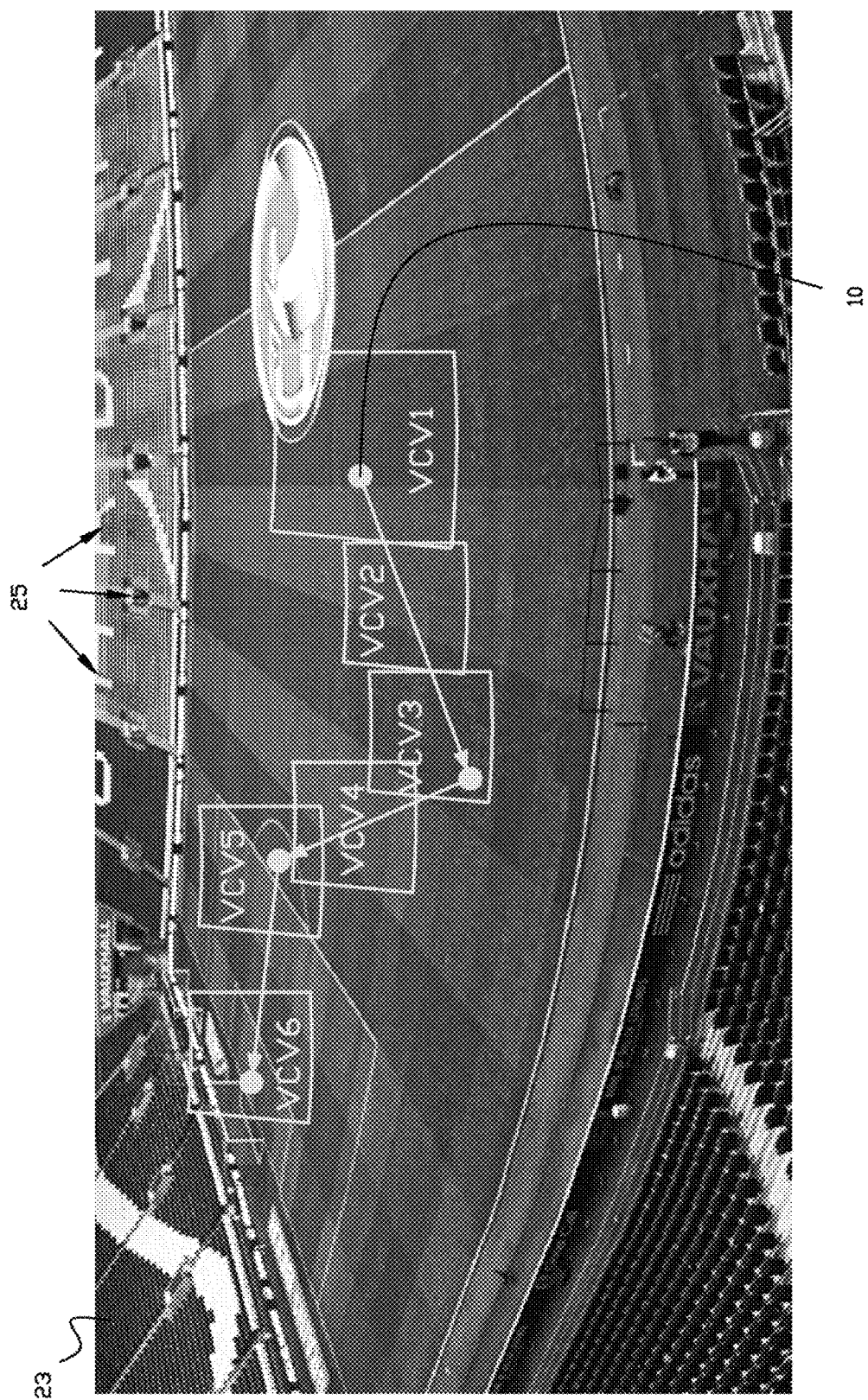
FIG. 19 illustrates a sequence of virtual camera views selected by the sports video production system for tracking a ball on the sports pitch; and, FIG. 20 illustrates the linking of fixed positions in the real world to fixed positions in the panoramic view of FIG. 7.

Possibilities created with the two last mentioned methods are illustrated by way of example in FIG. 19. A ball 10 can for example be detected in virtual camera view VCV3 and afterwards a virtual camera view CVC2 is chosen to go from virtual camera view VCV1 towards virtual camera view VCV3, so to make an output video stream 9 which has a natural look for a viewer.

Still another important aspect of the invention is that in some methods fixed positions in the panoramic views 23 and/or in one or more of the virtual camera views 25 defined on the basis of these panoramic views 23 are linked to fixed positions in the real world, such as the goals 13, the soccer field borders 14 and corners 15, the half-way line 16, the centre circle 17, the centre spot 18, the penalty spot 19 and so on.

Figure 20:
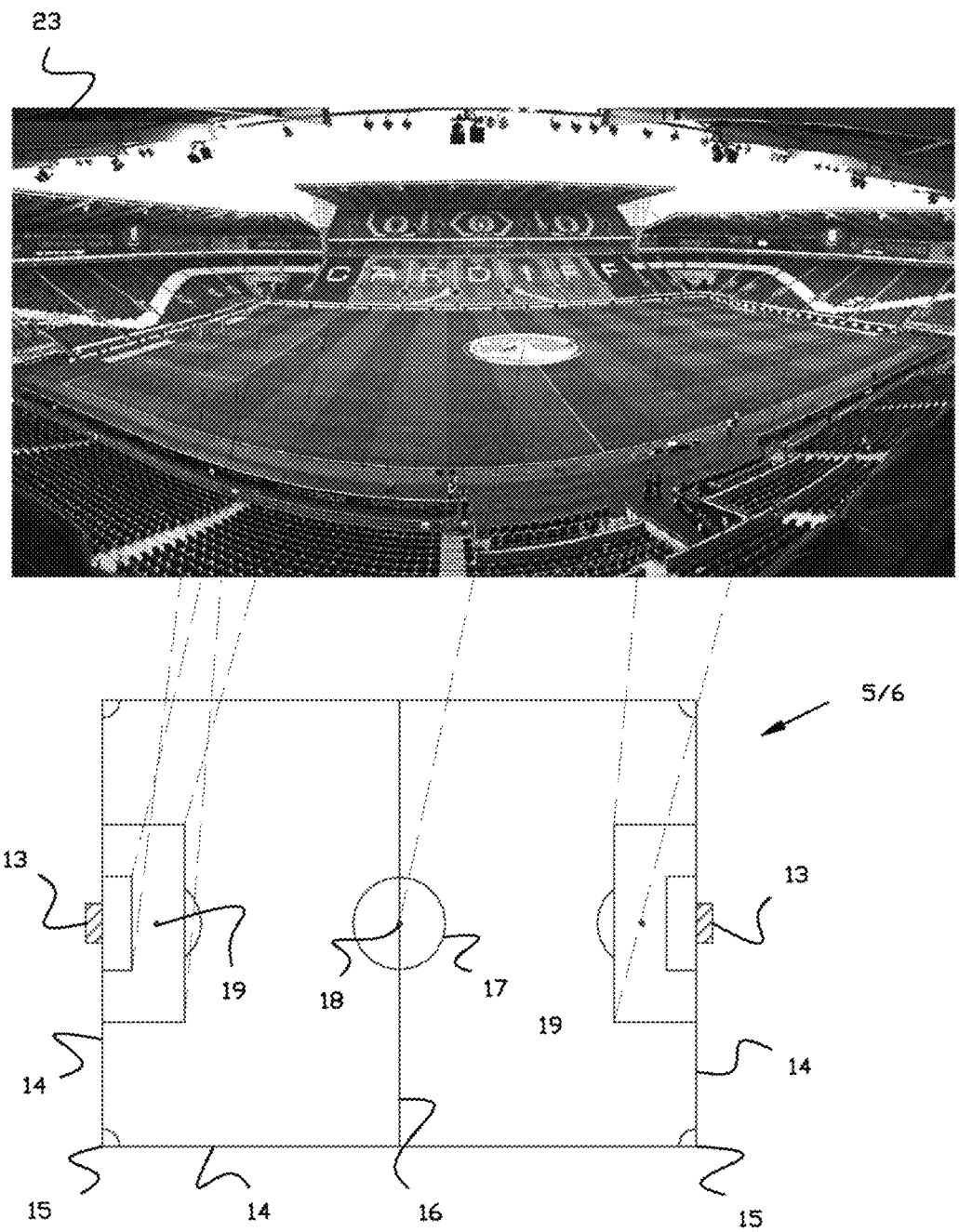

This is illustrated in FIG. 20. Knowing the coordinates of fixed positions in the real world and the corresponding coordinates in the panoramic views 2 makes the method for detection objects, such as the ball 10 and players 11, in the zone 5 even more accurate, and it allows for a good definition or selection of virtual camera views 25 for detection purposes as well as for broadcasting purposes.

The invention claimed is:

1. A method for detecting and/or tracking moving objects within a certain zone, such as a ball and/or one or more players on a sports pitch comprising:
   providing multiple physical cameras around the zone which are synchronised for, successively at regular instances after one another, taking simultaneously at every such instance a set of video frame images of the zone which form input video streams when put in a video sequence after one another, wherein the totality of video frame images of a set made at such an instance jointly cover at least the total area of the zone;
   composing a sequence of panoramic views of the zone so to form a panoramic video stream by cutting away overlapping parts of the video frame images of each set and stitching together remaining parts of the video frame images of each set;
   defining one or more virtual camera view(s) by selecting for each virtual camera view a corresponding partial or entire view of the panoramic views and by de-warping the selected, partial or entire views into square views or views with another geometry, which form a projection of a corresponding part of the zone;
   feeding each of the square, de-warped views or de-warped views with another geometry to a deep learning neural network or an AI-network so to form a corresponding virtual detector; and,
   performing a detection with the virtual detectors so to determine the presence or absence of objects in the corresponding part of the zone and possibly their type or class and their location in that part,
   wherein a total number (N) bigger than one, of virtual camera views is chosen for covering the complete zone, and
   wherein detection of objects in the entire zone is realised by feeding at each of the instances a restricted number (M), including one or a number (M) smaller than the total number (N), of virtual camera view leaning neural network or AI-network, hereby ensuring that after a certain number of instances the total number (N) of virtual camera views has been fed to the deep learning neural network or AI-network, so that detection is performed on the total zone, while the feed to the deep learning neural network of AI-network at every instance is reduced.

2. The method of claim 1, wherein the corresponding partial views are de-warped into square views or views with another geometry, after having made the selection of virtual camera views.

3. The method of claim 2, wherein the de-warped, selected views represent rectilinear projections of the concerned part of the zone.

4. The method of claim 1, wherein the panoramic views represent an equirectangular projection or other geometric projection, such as an equirectangular projection, of the zone and possible surroundings.

5. The method of claim 1, wherein the deep learning neural network or AI-network is a convolutional neural network (CNN) or is part of a YOLO ("You Look Only Once")-detection system.

6. The method of claim 1, wherein a part of one or more of the virtual camera views, corresponding to a part falling out of the zone to be detected, is masked before being fed to the deep learning neural network or AI-network so to increase detection speed and quality.

7. The method of claim 1, wherein virtual camera views are defined which remain static during detection.

8. The method of claim 1, wherein virtual camera views are defined and changed dynamically during detection in one or more of the following ways:
   a virtual camera view is added or removed during detection;
   a virtual camera view is modified or added for capturing another part of the zone; and/or,
   a zoom factor of a virtual camera view is adapted.

9. The method of claim 8, wherein a virtual camera view is added or modified so to create a centred or more or less centred view and/or a zoomed-in or zoomed-out view around a previously defined object.

10. The method of claim 9, wherein an algorithm is used for modifying or adding and removing one or more virtual camera views during detection, so to track a previously detected object.

11. The method of claim 10, wherein an algorithm is used which comprises and applies a so-called "look ahead"-function, wherein sets of video frame images or parts thereof, taken at consecutive instances by the physical cameras, are buffered in a memory and wherein an object is first detected with one or more virtual camera views in a later set of video frame images and wherein the definition of one or more virtual camera views for intermediate sets of video frame images is modified as a function of the detection of the object in the later set of video frame images.

12. The method of claim 11, wherein fixed positions in the panoramic views and/or in one or more of the virtual camera views defined on the basis of these panoramic views are linked to fixed positions fin the real world).

\* \* \* \* \*